(12) United States Patent
Andrivon et al.

(10) Patent No.: US 11,895,301 B2
(45) Date of Patent: Feb. 6, 2024

(54) ENCODING AND DECODING A POINT CLOUD USING PATCHES FOR IN-BETWEEN SAMPLES

(71) Applicant: INTERDIGITAL CE PATENT HOLDINGS, SAS, Paris (FR)

(72) Inventors: Pierre Andrivon, Liffre (FR); Yannick Olivier, Thorigne Fouillard (FR); Jean-Claude Chevet, Betton (FR); David Gendron, Chevaigne (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/763,025

(22) PCT Filed: Sep. 15, 2020

(86) PCT No.: PCT/EP2020/075680
§ 371 (c)(1),
(2) Date: Mar. 23, 2022

(87) PCT Pub. No.: WO2021/058315
PCT Pub. Date: Apr. 1, 2021

(65) Prior Publication Data
US 2022/0345709 A1 Oct. 27, 2022

(30) Foreign Application Priority Data
Sep. 24, 2019 (EP) .................................. 19306190

(51) Int. Cl.
*H04N 19/132* (2014.01)
*H04N 19/182* (2014.01)
(Continued)

(52) U.S. Cl.
CPC ......... *H04N 19/132* (2014.11); *H04N 19/182* (2014.11); *H04N 19/463* (2014.11); *H04N 19/597* (2014.11)

(58) Field of Classification Search
CPC .. H04N 19/132; H04N 19/182; H04N 19/463; H04N 19/597
See application file for complete search history.

(56) References Cited

U.S. PATENT DOCUMENTS

| 2019/0122393 A1* | 4/2019 | Sinharoy | ................. G06T 9/001 |
| 2020/0005518 A1* | 1/2020 | Graziosi | .............. H04N 19/597 |

(Continued)

FOREIGN PATENT DOCUMENTS

WO  WO-2019115867  * 12/2019

OTHER PUBLICATIONS

Graziosi et al., "V-PCC CE 2.18 Report", International Organization for Standardization, ISO/IEC JTC1/SC29/WG11, Document: MPEG2018/m46205, Marrakesh, Morocco, Jan. 2019, 2 pages.
(Continued)

*Primary Examiner* — Zaihan Jiang
(74) *Attorney, Agent, or Firm* — VOLPE KOENIG

(57) ABSTRACT

At least one embodiment relates to provides a method of encoding/decoding attribute of orthogonally projected 3D samples and in-between 3D samples in which an information indicates whether at least one first attribute patch of 2D samples obtained by encoding the attribute of said at least one orthogonally projected 3D samples according to a first attribute coding mode, and at least one second attribute patch of 2D samples of an image obtained by encoding the attribute of at least one in-between 3D sample, are stored in separate images.

20 Claims, 9 Drawing Sheets

(51) Int. Cl.
*H04N 19/597* (2014.01)
*H04N 19/463* (2014.01)

(56) References Cited

U.S. PATENT DOCUMENTS

| | | | |
|---|---|---|---|
| 2020/0105023 A1* | 4/2020 | Graziosi | G06T 9/001 |
| 2020/0195967 A1* | 6/2020 | Graziosi | H04N 19/80 |
| 2020/0236401 A1* | 7/2020 | Graziosi | H04N 19/20 |
| 2020/0302578 A1* | 9/2020 | Graziosi | G06T 9/00 |
| 2022/0108482 A1* | 4/2022 | Graziosi | G06T 9/001 |

OTHER PUBLICATIONS

Mammou et al., "Study Text of ISO/IEC CD 23090 5: Video-based Point Cloud Compression", International Organization for Standardization, ISO/IEC JTC1/SC29/WG11, Document: N18180, Marrakesh Morocco, Jan. 2019, 103 pages.

Anonymous, "High Efficiency Video Coding", ITU-T Telecommunication Standardization Sector of ITU, Series H: Audiovisual and Multimedia Systems, Infrastructure of audiovisual services—Coding of moving video, Recommendation ITU-T H.265, Feb. 2018, 692 pages.

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

Hoppe et al., "Surface Reconstruction from Unorganized Points", SIGGRAPH '92: Proceedings of the 19th Annual Conference on Computer Graphics and Interactive Techniques, Jul. 1992, 8 pages.

Sinharoy et al., "[V-PCC] Report on Core Experiment CE 2.18 on lossy additional points patch for improved visual quality", International Organization for Standardization, ISO/IEC JTC1/SC29/WG11, Document: MPEG2019/m45946, Marrakesh, Morocco, Jan. 2019, 10 pages.

Bross, "Versatile Video Coding (Draft 1)", Joint Video Experts Team (JVET) of ITU-T SG 16 WP 3 and ISO/IEC JTC 1/SC 29/WG 11, Document: JVET-J1001-v2, 10th Meeting: San Diego, California, United States, Apr. 10, 2018, 43 pages.

Budagavi et al., "PCC Core Experiments for Category 2", International Organization for Standardization, ISO/IEC JTC1/SC29/WG11, Document: N17624, San Diego, California, USA, Apr. 2018, 4 pages.

\* cited by examiner

| eom_patch_data_unit( patchIndex ) { | Descriptor |
|---|---|
|   if(vpcc_eom_patch_separate_video_present_flag ) | |
|     epdu_patch_in_eom_video_flag[patchIndex] | |
|   epdu_2d_shift_x[ patchIndex ] | u(v) |
|   epdu_2d_shift_y[ patchIndex ] | u(v) |
|   epdu_2d_delta_size_x[ patchIndex ] | se(v) |
|   epdu_2d_delta_size_y[ patchIndex ] | se(v) |
|   epdu_patch_count_minus1[ patchIndex ] | u(v) |
|   for( p = 0; p <= epdu_patch_count_minus1[ patchIndex ]; p++ ) { | |
|     epdu_points[ patchIndex ][ p ] | u(v) |
|   } | |
| } | |

Fig. 8

ENCODING AND DECODING A POINT CLOUD USING PATCHES FOR IN-BETWEEN SAMPLES

CROSS REFERENCE TO RELATED APPLICATIONS

This application is a U.S. National Stage Application under 35 U.S.C. 371 of International Patent Application No. PCT/EP2020/075680, filed Sep. 15, 2020, which is incorporated herein by reference in its entirety.

This application claims the benefit of European Patent Application No. 19306190.0, filed Sep. 24, 2019, which is incorporated herein by reference in its entirety.

TECHNICAL FIELD

At least one of the present embodiments relates generally to a processing of a point cloud. In particular, encoding/decoding of attribute of 3D samples in/from separate video streams is disclosed.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (Light Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method of encoding attribute of orthogonally projected 3D samples in which attribute of said orthogonally projected 3D samples is encoded as at least one first attribute patch of 2D samples of an image, and attribute of in-between 3D samples located between two orthogonally projected 3D samples along a same projection line is encoded as at least one second attribute patch of 2D samples in an image, wherein the method comprises encoding an information indicating whether said at least one first attribute patch of 2D samples and said at least one second attribute patch of 2D samples are stored in separate images.

According to an embodiment, video stream being hierarchically structured at a group of pictures level, frame level and patch level, said information is valid either at the group of pictures level, frame level, atlas level or patch level.

According to an embodiment, the information a first flag that indicates whether at least one first attribute patch of 2D sample is stored in a first image or if said at least one first attribute patch of 2D sample are stored with other attribute patch of 2D samples in a second image, and a second flag that indicates whether at least one second attribute patch of 2D sample is stored in a third image or if said at least one second attribute patch of 2D sample are stored with other attribute patch of 2D samples in said second image.

According to an embodiment, the method further comprises encoding another information indicating how a separate image is compressed.

According to a general aspect of at least one embodiment, there is provided a method of decoding attribute of 3D samples in which attribute of said 3D samples is decoded from at least one first attribute patch of 2D samples of an image, and attribute of in-between 3D samples located between two 3D samples along a same projection line is decoded as at least one second attribute patch of 2D samples in an image, wherein the method comprises decoding an information indicating whether said at least one first attribute patch of 2D samples and said at least one second attribute patch of 2D samples are stored in separate images.

According to an embodiment, video stream being hierarchically structured at a group of pictures level, frame level and patch level, said information is valid either at the group of pictures level, frame level, atlas level or patch level.

According to an embodiment, the information a first flag that indicates whether at least one first attribute patch of 2D sample is stored in a first image or if said at least one first attribute patch of 2D sample are stored with other attribute patch of 2D samples in a second image, and a second flag that indicates whether at least one second attribute patch of 2D sample is stored in a third image or if said at least one second attribute patch of 2D sample are stored with other attribute patch of 2D samples in said second image.

According to an embodiment, the method further comprises encoding another information indicating how a separate image is compressed.

One or more of at least one of embodiment also provide an apparatus, a bitstream, a computer program product and a non-transitory computer readable medium.

The specific nature of at least one of the present embodiments as well as other objects, advantages, features and uses of said at least one of the present embodiments will become evident from the following description of examples taken in conjunction with the accompanying drawings.

BRIEF DESCRIPTION OF DRAWINGS

In the drawings, examples of several embodiments are illustrated. The drawings show:

FIG. 8 illustrates an example of a syntax element embedding the information INF in accordance with at least one embodiment;

DETAILED DESCRIPTION

Figure 1:
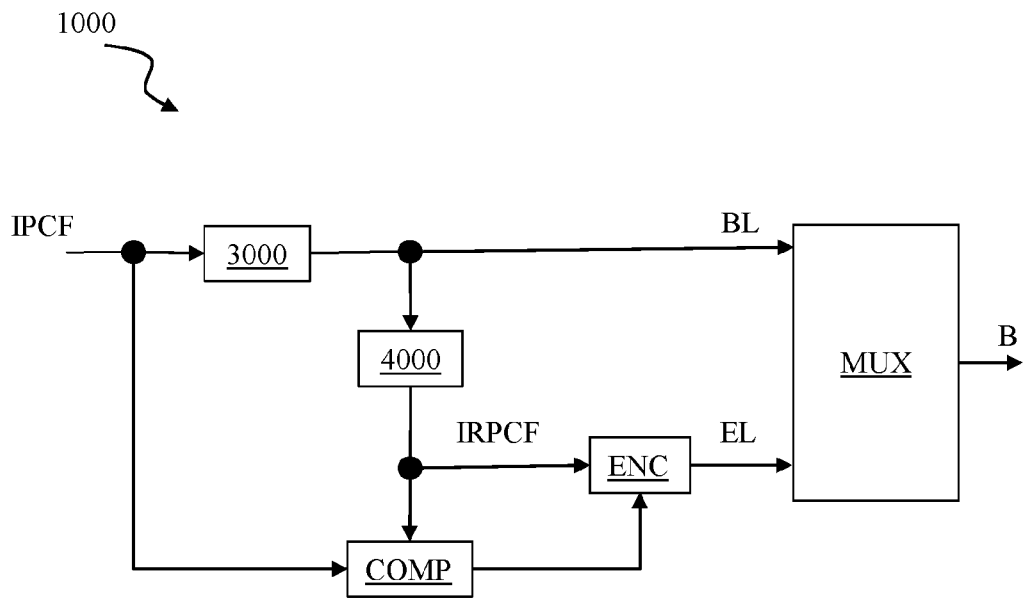
FIG. 1 illustrates a schematic block diagram of an example of a two-layer-based point cloud encoding structure in accordance with at least one of the present embodiments.

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

Some figures represent syntax tables widely used in V-PCC for defining the structure of a bitstream that conforms with V-PCC. In those syntax tables, the term ' . . . ' denotes unchanged portions of the syntax with respect to the original definition given in V-PCC and removed in the figures to facilitate reading. Bold terms in figures indicate that a value for this term is obtained by parsing a bitstream. The right column of the syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

The aspects described and contemplated below may be implemented in many different forms. FIGS. 1-8 below provide some embodiments, but other embodiments are contemplated and the discussion of FIGS. 1-8 does not limit the breadth of the implementations.

At least one of the aspects generally relates to point cloud encoding and decoding, and at least one other aspect generally relates to transmitting a bitstream generated or encoded.

More precisely, various methods and other aspects described herein may be used to modify modules, for example, the image-based encoder 3000 and decoder 4000 as shown in FIGS. 1-8.

Moreover, the present aspects are not limited to MPEG standards such as MPEG-I part 5 that relates to the Point Cloud Compression, and may be applied, for example, to other standards and recommendations, whether pre-existing or future-developed, and extensions of any such standards and recommendations (including MPEG-I part 5). Unless indicated otherwise, or technically precluded, the aspects described in this application may be used individually or in combination.

In the following, image data refer to data, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component, in the shape of a first 2D array of samples, usually representative of luminance (or luma) of the image. An image may also include a second component and a third component, in the shape of other 2D arrays of samples, usually representative of the chrominance (or chroma) of the image. Some embodiments represent the same information using a set of 2D arrays of color samples, such as the traditional tri-chromatic RGB representation.

A pixel value is represented in one or more embodiments by a vector of C values, where C is the number of components. Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that may have unique coordinates and that may also have one or more attributes.

A 3D sample may comprise information that defines the geometry of a 3D point of a point cloud that may be represented by its X, Y, and Z coordinates in a 3D space. It may also comprise information that defines one or more associated attributes such as a color, represented in the RGB or YUV color space for example, a transparency, a reflectance, a two-component normal vector or any feature representing a feature of this sample. For example, a 3D sample may comprise information that defines 6 components (X, Y, Z, R, G, B) or equivalently (X, Y, Z, y, U, V) where (X,Y,Z) defines the coordinates of a 3D point in a 3D space and (R,G,B) or (y,U,V) defines a color of this 3D point. The same type of attribute may be present multiple times. For example, multiple color attributes may provide color information from different points of view.

A 2D sample may comprise information that defines the geometry of an orthogonally projected 3D sample that may be represented by three coordinates (u, v, Z) where (u,v) are coordinates in a 2D space of the orthogonally projected 3D, and Z is the Euclidean distance between the 3D sample and a projection plane on which said 3D sample is orthogonally projected. Z is usually denoted a depth value. A 3D sample may also comprise information that defines one or more associated attributes such as a color, represented in the RGB or YUV color space for example, a transparency, a reflectance, a two-component normal vector or any feature representing a feature of this orthogonally projected 3D sample.

Thus, a 2D sample may comprises information that defines the geometry and attribute of an orthogonally projected 3D sample by (u, v, Z, R, G, B) or equivalently (u, v, Z, y, U, V).

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of points is generally not constant but, on the contrary, generally changes with time. More generally, a point cloud may be considered as dynamic if anything changes with time, such as, for example, the number of points, the position of one or more points, or any attribute of any point.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of an input point cloud frame IPCF. Possibly, said input point cloud frame IPCF represents a frame of a dynamic point cloud. Then, a frame of said dynamic point cloud may be encoded by the two-layer-based point cloud encoding structure 1000.

Then a video stream may be obtained for representing a dynamic point cloud by combining altogether the bitstreams representing each frame of said dynamic point cloud.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a higher quality (possibly lossless) representation by encoding isolated points not represented by the base layer BL.

Figure 3:
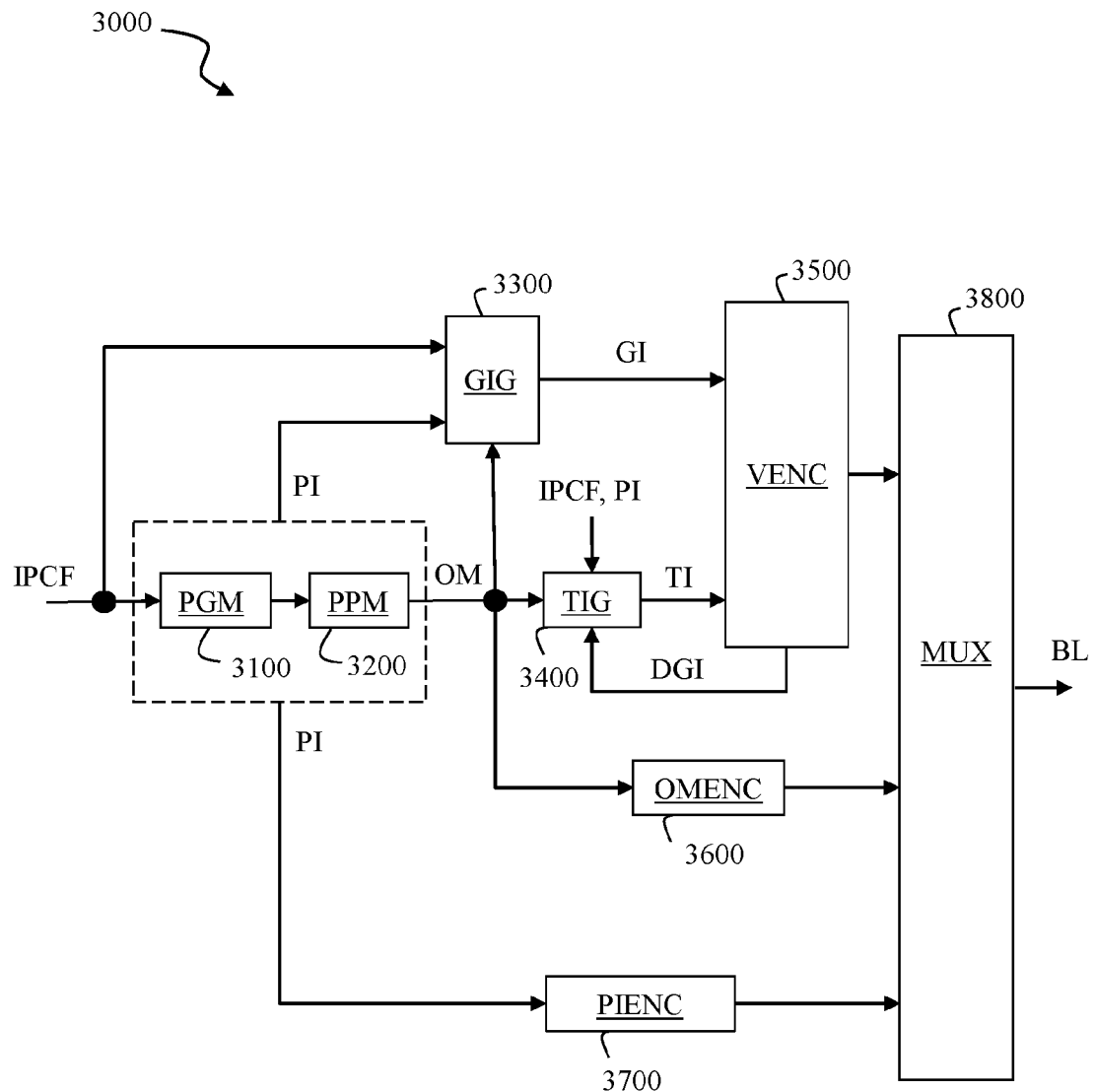
FIG. 3 illustrates a schematic block diagram of an example of an image-based point cloud encoder in accordance with at least one of the present embodiments.
Figure 4:
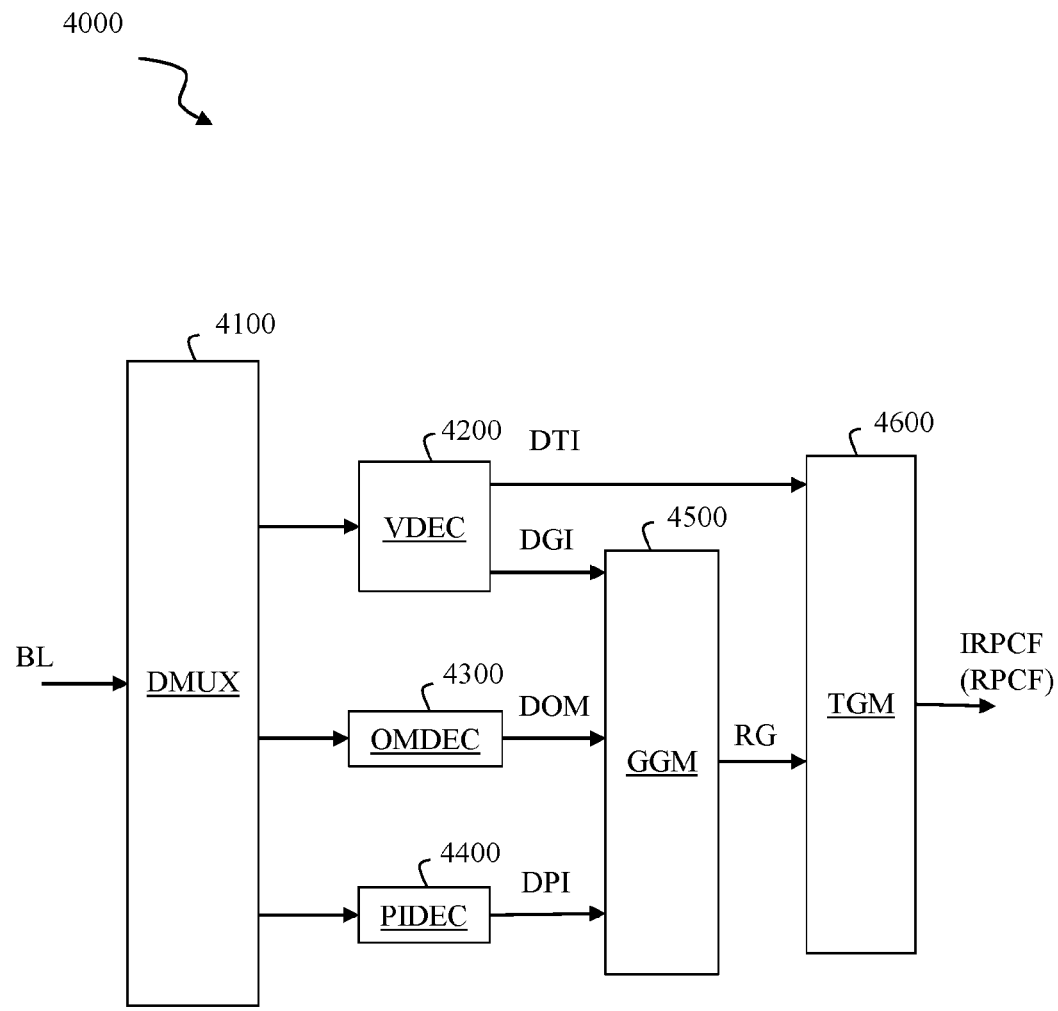
FIG. 4 illustrates a schematic block diagram of an example of an image-based point cloud decoder in accordance with at least one of the present embodiments.

The base layer BL may be provided by an image-based encoder 3000 as illustrated in FIG. 3. Said image-based encoder 3000 may provide geometry/attribute images representing the geometry/attribute of 3D samples of the input point cloud frame IPCF. It may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of said 3D reference samples R.

In a variant, those differences may be encoded separately.

For example, for a missed 3D sample M, with spatial coordinates $x(M)$, $y(M)$ and $z(M)$, a x-coordinate position difference $Dx(M)$, a y-coordinate position difference $Dy(M)$, a z-coordinate position difference $Dz(M)$, a R-attribute component difference $Dr(M)$, a G-attribute component difference $Dg(M)$ and the B-attribute component difference $Db(M)$ may be calculated as follows:

$$Dx(M)=x(M)-x(R),$$

where $x(M)$ is the x-coordinate of the 3D sample M, respectively R in a geometry image provided by FIG. 3, $$Dy(M)=y(M)-y(R),$$

where $y(M)$ is the y-coordinate of the 3D sample M, respectively R in a geometry image provided by FIG. 3, $$Dz(M)=z(M)-z(R),$$

where $z(M)$ is the z-coordinate of the 3D sample M, respectively R in a geometry image provided by FIG. 3, $$Dr(M)=R(M)-R(R).$$

where $R(M)$, respectively $R(R)$ is the r-color component of a color attribute of the 3D sample M, respectively R, $$Dg(M)=G(M)-G(R).$$

where $G(M)$, respectively $G(R)$ is the g-color component of a color attribute of the 3D sample M, respectively R, $$Db(M)=B(M)-B(R).$$

where $B(M)$, respectively $B(R)$ is the b-color component of a color attribute of the 3D sample M, respectively R.

Figure 2:
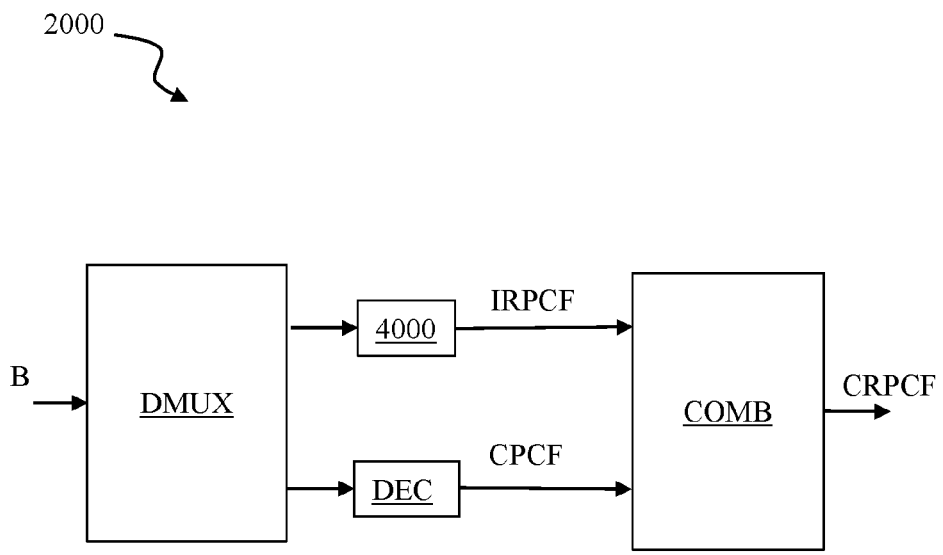
FIG. 2 illustrates a schematic block diagram of an example of a two-layer-based point cloud decoding structure in accordance with at least one of the present embodiments.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version IRPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the intermediate reconstructed point cloud frame IRPCF from the base layer BL. The decoder DEC may determine a complementary point cloud frame CPCF from the enhancement layer EL. A combiner COMB then may combine together the intermediate reconstructed point cloud frame IRPCF and the complementary point cloud frame CPCF to therefore provide a higher quality (possibly lossless) representation (re-construction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and attribute information of 3D samples of an input dynamic point cloud using different video streams.

In particular embodiments, two video streams, one for capturing the geometry information of 3D samples of the input point cloud and another for capturing the attribute information of these 3D samples, may be generated and compressed using existing video codecs. An example of an existing video codec is the HEVC Main profile encoder/decoder (ITU-T H.265 Telecommunication standardization sector of ITU (02/2018), series H: audiovisual and multimedia systems, infrastructure of audiovisual services—coding of moving video, High efficiency video coding, Recommendation ITU-T H.265).

Additional metadata that are used to interpret the two video streams are typically also generated and compressed separately. Such additional metadata includes, for example, an occupancy map OM and/or auxiliary patch information PI.

The generated video streams and the metadata may then be multiplexed together so as to generate a combined stream.

It should be noted that the metadata typically represents a small amount of the overall information. The bulk of the information is in the video streams.

An example of such a point cloud coding/decoding process is given by the Test model Category 2 algorithm (also denoted V-PCC) that implements the MPEG draft standard as defined in ISO/IEC JTC1/SC29/WG11, Information technology—Coded Representation of Immersive Media—Part 5: Video-based Point Cloud Compression, CD stage, SCD_d39, ISO/IEC 23090-5.

In step 3100, a module PGM may generate at least one patch of 2D samples by orthogonally projecting the 3D samples of a frame IPCF of an input point cloud frame to 2D samples on a projection plane using a strategy that provides best compression.

A patch of 2D samples may be defined as a set of 2D samples sharing common properties.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. *ACM SIGGRAPH* 1992 *Proceedings,* 71-78). Next, an initial clustering of the 3D samples is obtained by associating each 3D sample with one of the six oriented planes of a 3D bounding box encompassing the 3D samples. More precisely, each 3D sample is clustered and associated with an oriented plane that has the closest normal (that is maximizes the dot product of the point normal and the plane normal). Then the 3D samples are orthogonally projected to their associated planes (projection plane). A set of 3D samples that forms a connected area in their plane is referred as a connected component. A connected component is thus a set of at least one 3D sample having similar normal and a same associated oriented plane. The initial clustering is then refined by iteratively updating the cluster associated with each 3D sample based on its normal and the clusters of its nearest neighboring samples. The final step consists of generating one patch of 2D samples from each connected component, that is done by projecting the 3D samples of each connected component onto the oriented plane associated with said connected component.

The 2D samples of a patch of 2D samples then shares a same normal and a same oriented plane and they are closely located to each other.

A patch of 2D samples is associated with auxiliary patch information PI that represents auxiliary patch information used for interpreting the geometry/attribute of the 2D samples of this patch of 2D samples.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch of 2D samples onto a 2D grid (also denoted canvas or atlas) without any overlapping in a manner that typically minimizes the unused space, and may guarantee that every T×T (for example, 16×16) block of the 2D grid is associated with a unique patch. A given minimum block size T×T of the 2D grid may specify the minimum distance between distinct patches of 2D samples as placed on this 2D grid. The 2D grid resolution may depend on the input point cloud frame size and its width W and height H and the block size T may be transmitted as metadata to the decoder.

The auxiliary patch information PI may further include information relative to an association between a block of the 2D grid and a patch of 2D samples.

Figure 3A:
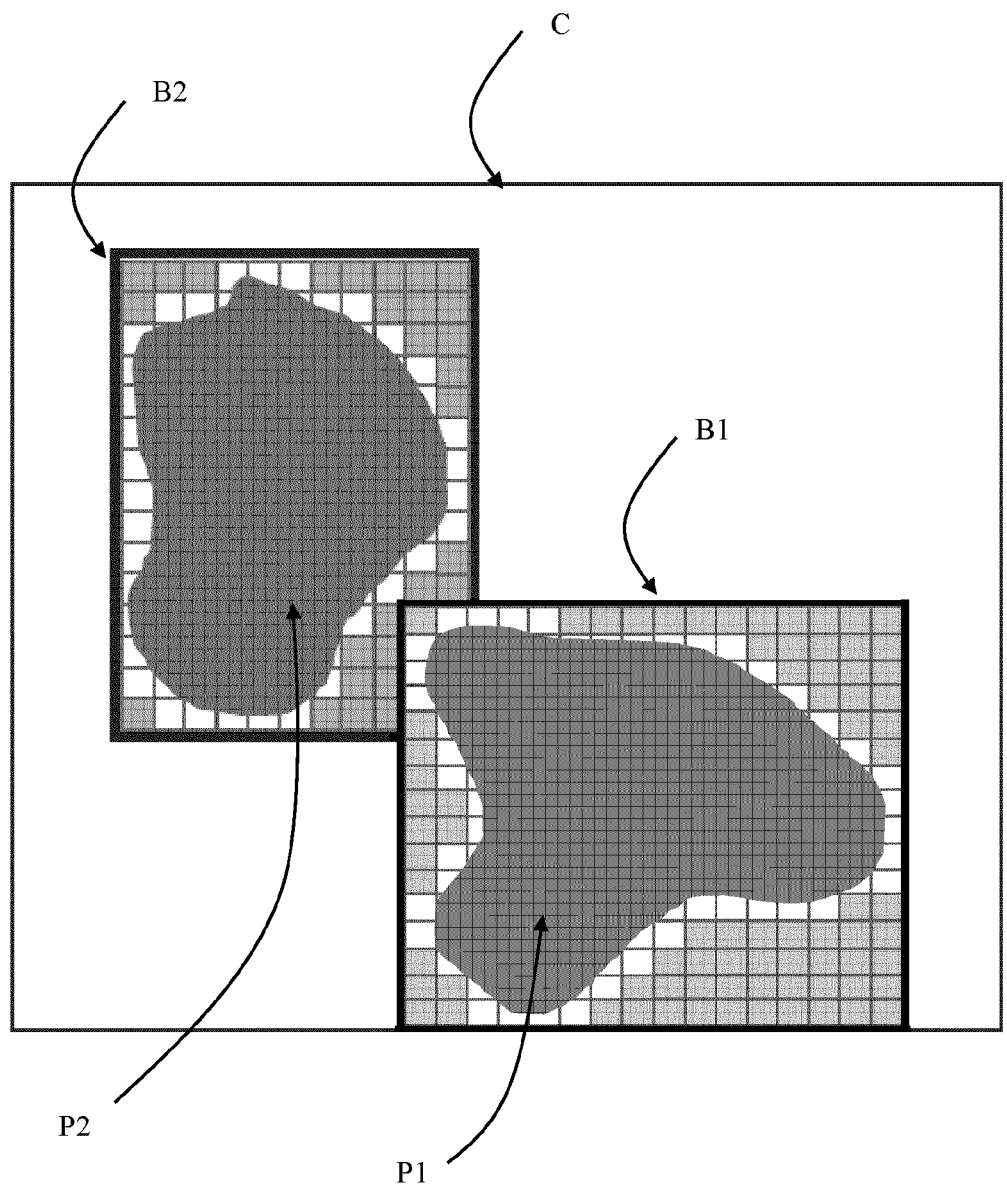
FIG. 3a illustrates an example of a canvas comprising 2 patches and their 2D bounding boxes.

FIG. 3a illustrates an example of a canvas C comprising 2 patches of 2D samples P1 and P2 and their associated 2D bounding boxes B1 and B2. Note that two bounding boxes may overlap in the canvas C as illustrated on FIG. 3a. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch of 2D samples may be considered as occupied blocks. Each occupied block of the canvas is represented by a particular pixel value (for example 1) in the occupancy map OM and each unoccupied block of the canvas is represented by another particular value, for example 0. Then, a pixel value of the occupancy map OM may indicate whether a T×T block of the canvas is occupied, that is contains at least one 2D sample that belong to a patch of 2D samples.

In FIG. 3a, an occupied block is represented by a white block and light grey blocks represent unoccupied blocks. The image generation processes (steps 3300 and 3400) exploit the mapping of the at least one generated patch of 2D samples onto the 2D grid computed during step 3200, to store the geometry and attribute of the 3D samples as images.

In step 3300, a geometry image generator GIG may generate at least one geometry image GI from at least one patch of 2D samples, the occupancy map OM and the auxiliary patch information PI.

A geometry image GI may represent the geometry of at least one patch of 2D samples and may be a monochromatic image of W×H pixels represented, for example, in YUV420-8 bit format.

The geometry image generator GIG may exploit the occupancy map information in order to detect (locate) the occupied blocks of the 2D grid on which said at least one patch of 2D samples are defined and thus the non-empty pixels in the geometry image GI.

In order to better handle the case of multiple 3D samples being projected (mapped) to same coordinates of the projection plane (along a same projection direction line), multiple layers may be generated. Thus, different depth values $D1, \ldots, Dn$ may be obtained and associated with 2D samples of a same patch of 2D samples. Multiple geometry images $GI1, \ldots, GIn$ may then be generated, each for a particular depth value of the patch of 2D samples.

In V-PCC, 2D samples of a patch may be projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths.

According to an embodiment of step 3300, the geometry of at least one patch of 2D samples (geometry of at least one orthogonally projected 3D point), is encoded according to a regular geometry coding mode RGCM. The regular geometry coding mode RGCM outputs at least one regular geometry patch of 2D samples RG2DP from the geometry of said at least one patch of 2D samples.

According to an embodiment, the regular geometry coding mode RGCM may code (derive) depth values associated with 2D samples of a patch of 2D samples relative to a layer (first or second or both) as a luma component g(u,v) given by: $g(u, v) = \delta(u, v) - \delta 0$. It is noted that this relationship may be employed to reconstruct 3D sample locations ($\delta 0$, s0, r0) from a reconstructed geometry image g(u, v) with the accompanying auxiliary patch information PI.

According to an embodiment of step 3300, the geometry of at least one patch of 2D samples (geometry of at least one orthogonally projected 3D point), is encoded according to a first geometry coding mode FGCM. The first geometry coding mode FGCM outputs at least one first geometry patch of 2D samples FG2DP from the geometry said at least one patch of 2D samples.

According to an embodiment, the first geometry coding mode FGCM directly encodes the geometry of 2D samples of said at least one patch of 2D samples as pixel values of a geometry image.

For example, when the geometry is represented by three coordinates (u, v, Z), then three consecutive pixels of an image are used: one for encoding u, another one for v and another one for Z coordinate.

According to an embodiment of step 3300, the geometry of at least one in-between 3D sample is encoded according to a second geometry coding mode SGCM. The second geometry coding mode SGCM outputs at least one second geometry patch of 2D samples SG2DP from the geometry of said at least one in-between 3D sample.

An in-between 3D sample may reside between a first and a second orthogonally projected 3D samples along a same projection line. This in-between 3D sample and said first and second orthogonally projected 3D samples have the same coordinates on the projection plane and different depth values.

In a variant, an in-between 3D sample may be defined from a single orthogonally projected 3D sample and a length of an EOM codeword. The depth value of the "virtual" second orthogonally projected 3D sample is then equal to the depth value of the first orthogonally projected 3D sample plus said length value of the EOM codeword. The first and "virtual" orthogonally projected 3D sample have the same coordinates on the projection plane and different depth values.

Possibly, the length of an EOM codeword is embedded in a syntax element of the bitstream.

In the following, an in-between 3D sample will be considered as residing between a first and a second orthogonally projected 3D sample even if said second orthogonally projected 3D sample is "virtual".

Further, said in-between 3D sample has a depth value greater than the depth value of the first orthogonally projected 3D sample and lower than the depth value of the second orthogonally projected 3D sample.

Multiple in-between 3D samples may exist between a first and a second orthogonally projected 3D sample. Thus, a designated bit of a codeword may be set for each of said in-between 3D samples to indicate if an in-between 3D sample exists (or not) at a particular distance from one of the two orthogonally projected 3D samples (at a particular spatial location along the projection line).

Figure 3B:
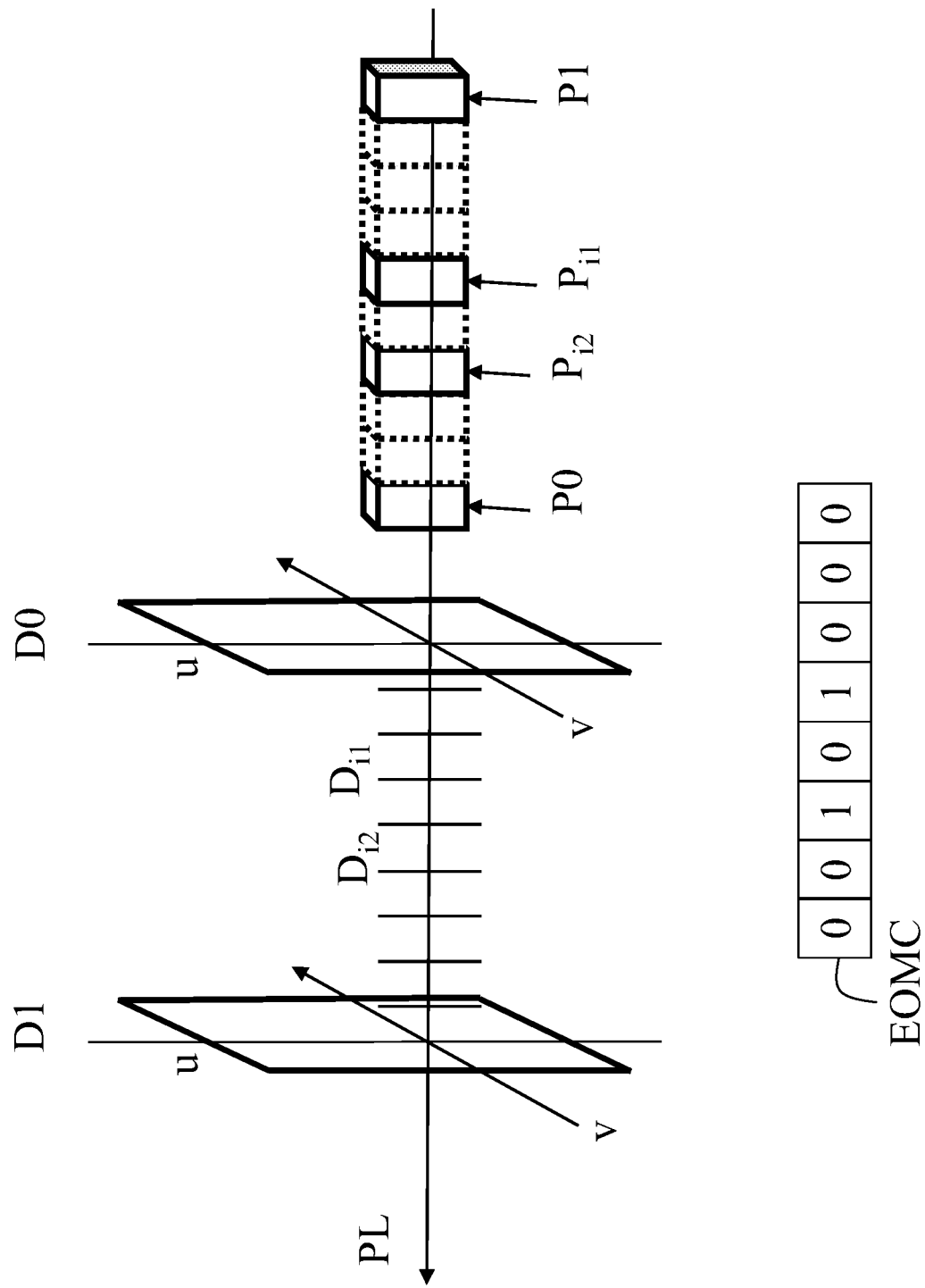
FIG. 3b illustrates an example of two in-between 3D samples located between two 3D samples along a projection line.

FIG. 3b illustrates an example of two in-between 3D samples $P_{i1}$ and $P_{i2}$ located between two 3D samples P0 and P1 along a projection line PL. The 3D samples P0 and P1 have respectively depth values equal to D0 and D1. The depth values $D_{i1}$ and $D_{i2}$ of respectively the two in-between 3D samples $P_{i1}$ and $P_{i2}$ are greater than D0 and lower than D1.

Then, all said designated bits along said projection line may be concatenated to form a codeword, denoted Enhanced-Occupancy map (EOM) codeword hereafter. As illustrated in FIG. 3b, assuming an EOM codeword of 8 bits of length, 2 bits equal 1 to indicate the location of the two 3D samples $P_{i1}$ and $P_{i2}$.

According to an embodiment of the second geometry coding mode SGCM, all the EOM codewords are packed together to form at least one second geometry patch of 2D samples SG2DP.

Said at least one second geometry patch of 2D samples SG2DP belong to an image and the coordinates of pixels in said image indicate two of the three coordinates of in-between 3D samples (when those pixels refer to EOM codewords) and the values of those pixels indicates the third coordinate of these in-between 3D samples.

According to an embodiment, said at least one second geometry patch of 2D samples SG2DP belong to the occupancy map OM.

In step 3400, an attribute image generator TIG may generate at least one attribute image TI from at least one patch of 2D samples, the occupancy map OM, the auxiliary patch information PI and a geometry of 3D samples derived from at least one decoded geometry image DGI, output of a video decoder VDEC (step 4200 in FIG. 4).

An attribute image TI may represent the attribute of 3D samples and may be an image of W×H pixels represented, for example, in YUV420-8 bit format.

The attribute image generator TG may exploit the occupancy map information in order to detect (locate) the occupied blocks of the 2D grid on which said at least one patch of 2D samples are defined and thus the non-empty pixels in the attribute image TI.

The attribute image generator TIG may be adapted to generate and associate an attribute image TI with each geometry image DGI.

Multiple attribute images TI1, . . . , TIn may then be generated, each for a particular depth value of a patch of 2D samples (for each geometry image).

According to an embodiment of step 3400, the attribute of at least one patch of 2D samples (attribute of orthogonally projected 3D samples) is encoded according to a regular attribute coding mode RACM. The regular attribute coding mode RACM outputs at least one regular attribute patch of 2D samples RA2DP from the attribute of said at least one patch of 2D samples.

According to an embodiment, the regular attribute coding mode RACM may code (store) the attribute T0 associated with 2D samples of a patch of 2D samples relative to a first layer as pixel values of a first attribute image TI0 and the attribute values T1 associated with the 2D samples of a patch of 2D samples relative to a second layer as pixel values of a second attribute image TI1.

Alternatively, the attribute image generating module TIG may code (store) the attribute values T1 associated with 2D samples of a patch of 2D samples relative to a second layer as pixel values of the first attribute image TI0 and the attribute values T0 associated with the 2D samples of a patch of 2D samples relative to a first layer as pixel values of the second attribute image TI1.

For example, colors of 3D samples may be obtained as described in section 2.2.3, 2.2.4, 2.2.5, 2.2.8 or 2.5 of V-PCC.

According to an embodiment of step 3400, the attribute of at least one patch of 2D samples (attribute of orthogonally projected 3D samples) is encoded according to a first attribute coding mode FACM. The first attribute coding mode FACM outputs at least one first attribute patch of 2D samples FA2DP from the attribute of said at least one patch of 2D samples.

According to an embodiment, the first attribute coding mode FACM encodes directly the attribute of 2D samples of said at least one patch of 2D samples as pixel values of an image.

According to an embodiment, said at least one patch of 2D samples belongs to an attribute image.

For example, attributes of orthogonally projected 3D samples may be obtained as described in section 2.2.3, 2.2.4, 2.2.5, 2.2.8 or 2.5 of V-PCC.

According to an embodiment of step 3400, the attribute of in-between 3D samples is encoded according to a second attribute coding mode SACM. The second attribute coding mode SACM outputs at least one second attribute patch of 2D samples SA2DP from the attribute of said at least one in-between 3D sample.

The attribute values of in-between 3D samples cannot be stored directly as pixel values of an attribute image because the locations of those pixels correspond to occupied blocs that are already used for storing attribute value of other 2D samples as illustrated in FIG. 3*b*.

According to an embodiment of the second attribute coding mode SACM, the attribute values of in-between 3D samples are packed altogether to form at least one second attribute patch of 2D samples.

According to an embodiment, said at least one second attribute patch of 2D samples belong to an attribute image.

In V-PCC, the locations of said at least one second attribute patch of 2D samples are procedurally defined (section 9.4.5 of V-PCC). In brief, this process determines locations of unoccupied blocks in the attribute image and stored the attribute values associated with in-between 3D samples as pixel values of said unoccupied blocks of the attribute image. That avoids overlaps between occupied blocks and second attribute patch of 2D samples.

In step 3500, a video encoder VENC may encode the generated images/layers TI and GI.

In step 3600, an encoder OMENC may encode the occupancy map as an image as detailed, for example, in section 2.2.2 of V-PCC. Lossy or lossless encoding may be used.

According to an embodiment, the video encoder ENC and/or OMENC may be a HEVC-based encoder.

In step 3700, an encoder PIENC may encode the auxiliary patch information PI and possibly additional metadata such as the block size T, the width W and height H of the geometry/attribute images.

According to an embodiment, the auxiliary patch information may be differentially encoded (as defined, for example in section 2.4.1 of V-PCC).

In step 3800, a multiplexer may be applied to the generated outputs of steps 3500, 3600 and 3700, and as a result these outputs may be multiplexed together so as to generate a combined stream representative of the base layer BL. It should be noted that the metadata information represents a small fraction of the overall bitstream.

The encoder 3000 may also be used for encoding dynamic point cloud: each frame of this point cloud is then encoded iteratively. At least one geometry image (step 3300), at least one attribute image (step 3400) an occupancy map (step 3600) and auxiliary patch information (step 3700) are then generated for each frame. Then, the geometry image generated for all the frames of the point cloud may be combined altogether to form a video stream, the attribute image to form another video stream, and the occupancy maps to form another video stream. The auxiliary patch information may be added to generate video streams or all the auxiliary patch information may be packed altogether to form another video stream. All these video streams may then be multiplexed (step 3800) to form a single bitstream BL.

FIG. 4 illustrates a schematic block diagram of an example of an image-based point cloud decoder 4000 in accordance with at least one of the present embodiments.

The decoder 4000 may be used for decoding a point cloud frame from a bitstream comprising multiple image streams (at least one geometry image stream, at least one attribute image stream, an occupancy map stream and auxiliary patch information image stream). But, it may also be used for decoding a dynamic point cloud comprising multiple frames. In that case, each frame of the dynamic point cloud is decoded by extracting information from video streams embedded in the bitstreams (geometry video streams, attribute video streams, occupancy video stream, auxiliary patch information video stream).

In step 4100, a de-multiplexer DMUX may apply to demutiplex the encoded information of the bitstream representative of the base layer BL.

In step 4200, a video decoder VDEC may decode encoded information to derive at least one decoded geometry image DGI and at least one decoded attribute image DTI relative to the decoding of 3D samples of a point cloud frame.

In step 4300, a decoder OMDEC may decode encoded information to derive a decoded occupancy map DOM relative to the decoding the 3D samples. According to an embodiment, the video decoder VDEC and/or OMDEC may be an HEVC-based decoder.

In step 4400, a decoder PIDEC may decode encoded information to derive auxiliary patch information DPI relative to the decoding of 3D samples.

Possibly, metadata may also be derived from the bitstream BL.

In step 4500, a geometry generating module GGM may derive the geometry RG of 3D samples of a point cloud frame IRPCF from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DGI.

Said non-empty pixels belong to either occupied blocks or EOM reference blocks depending on pixels values of the decoded occupancy information DOM and value of D1-D0 as explained above.

According to an embodiment of step 4500, when said non-empty pixels belong to an occupied block, the geometry of a 3D samples is decoded according to a regular geometry decoding mode RGDM.

According to an embodiment, the regular geometry decoding mode RGDM derives the 3D coordinates of 3D samples from coordinates of non-empty pixels, values of said non-empty pixels of one of the at least one decoded geometry image DGI, the decoded auxiliary patch information, and possibly, from additional metadata.

The use of non-empty pixels is based on 2D pixel relationship with 3D samples. For example, with the said projection in V-PCC, the 3D coordinates of reconstructed 3D samples may be expressed in terms of depth $\delta(u, v)$, tangential shift $s(u, v)$ and bi-tangential shift $r(u, v)$ as follows:

$$\delta(u, v) = \delta 0 + g(u, v)$$

$$s(u, v) = s0 - u0 + u$$

$$r(u, v) = r0 - v0 + v$$

where g(u, v) is the luma component of a decoded geometry image DGI, (u,v) is a pixel associated with a reconstructed 3D sample, ($\delta 0$, s0, r0) is the 3D location of a connected component to which the reconstructed 3D sample belongs and (u0, v0, u1, v1) are the coordinates in a projection plane defining a 2D bounding box encompassing the projection of a patch associate with said connected component.

According to an embodiment of step 4500, the geometry of a 3D samples is decoded according to a first geometry decoding mode FGDM.

According to an embodiment, the first geometry decoding mode FGDM directly decodes the geometry of 3D samples from pixel values of a decoded geometry image DGI.

For example, when the geometry is represented by three coordinates (u, v, Z), then three consecutive pixels of an image are used: u coordinate equals the value of one pixel of the geometry image, v of another one, and Z of another one.

According to an embodiment of step 4500, the geometry of at least one in-between 3D sample is decoded according to a second geometry decoding mode SGDM.

According to an embodiment, the second geometry coding mode SGCM may derive two of the 3D coordinates of in-between 3D samples from coordinates of non-empty pixels, and the third one from the bit values of the EOM codewords.

For example, according to the example of FIG. 3b, the EOM codeword EOMC is used for determining the 3D coordinates of in-between 3D samples $P_{i1}$ and $P_{i2}$. The third coordinate of the in-between 3D sample $P_{i1}$ may be derived, for example, from D0 by $D_{i1} = D0+3$ and the third coordinate of the reconstructed 3D sample $P_{i2}$ may be derived, for example, from D0 by $D_{i2} = D0+5$. The offset value (3 or 5) is the number of intervals between D0 and D1 along the projection line.

In step 4600, an attribute generating module TGM may derive the attribute of 3D samples of the reconstructed point cloud frame IRPCF from the geometry RG of said 3D samples and the at least one decoded attribute image DTI.

According to an embodiment of step 4600, the attribute of a 3D sample whose geometry was decoded by the regular geometry decoding mode RGDM, is decoded according to a regular attribute decoding mode RADM. The first attribute decoding mode RADM may decode the attribute of a 3D samples from pixel values of an attribute image.

According to an embodiment of step 4600, the attribute of a 3D sample whose geometry was decoded by the first geometry decoding mode FGDM, is decoded according to a first attribute decoding mode FADM. The first attribute decoding mode FADM may decode the attribute of a 3D samples from pixel values of an attribute image.

According to an embodiment of step 4600, the attribute of an in-between 3D sample is decoded according to a second attribute decoding mode SADM.

According to an embodiment, the second attribute decoding mode SADM may derive the attribute of in-between 3D sample from a second attribute patch of 2D samples SA2DP.

According to an embodiment, said at least one second attribute patch of 2D samples belong to an attribute image.

In V-PCC, the locations of said at least one second attribute patch of 2D samples are procedurally defined (section 9.4.10 of V-PCC). In brief, this process determines locations of unoccupied blocks in the attribute image and derive the attribute values associated with in-between 3D samples from pixel values of said unoccupied blocks of the attribute image.

Figure 5:
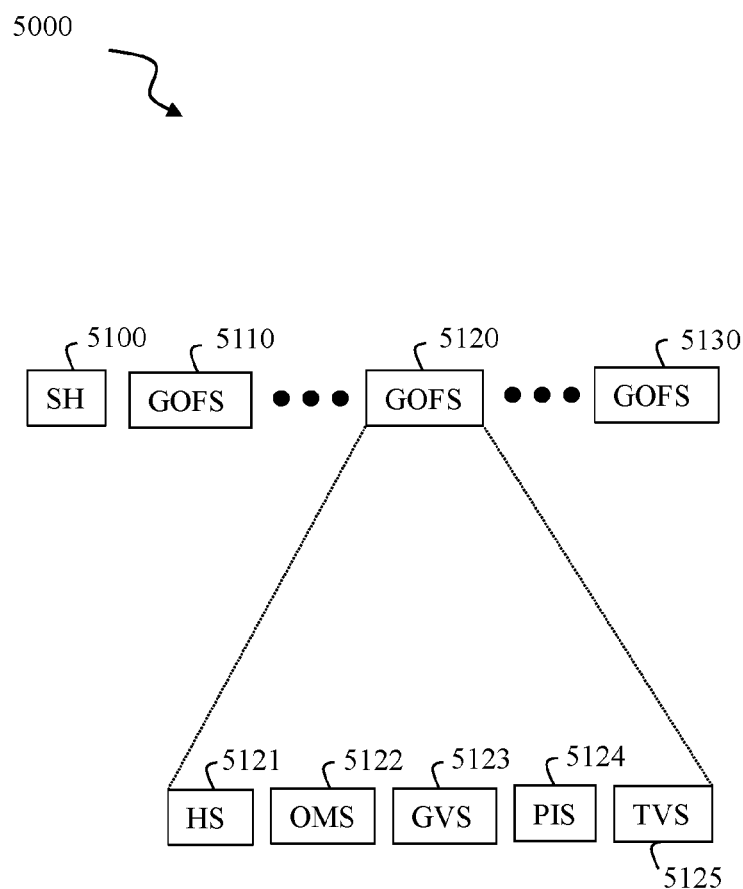
FIG. 5 illustrates schematically an example of syntax of a bitstream representative of a base layer BL in accordance with at least one of the present embodiments.

FIG. 5 illustrates schematically an example syntax of a bitstream representative of a base layer BL in accordance with at least one of the present embodiments.

The bitstream comprises a Bitstream Header SH and at least one Group Of Frame Stream GOFS.

A group of frame stream GOFS comprises a header HS, at least one syntax element OMS representative of an occupancy map OM, at least one syntax element GVS representative of at least one geometry image (or video), at least one syntax element TVS representative of at least one attribute image (or video) and at least one syntax element PIS representative of auxiliary patch information and other additional metadata.

In a variant, a group of frame stream GOFS comprises at least one frame stream.

Figure 6:
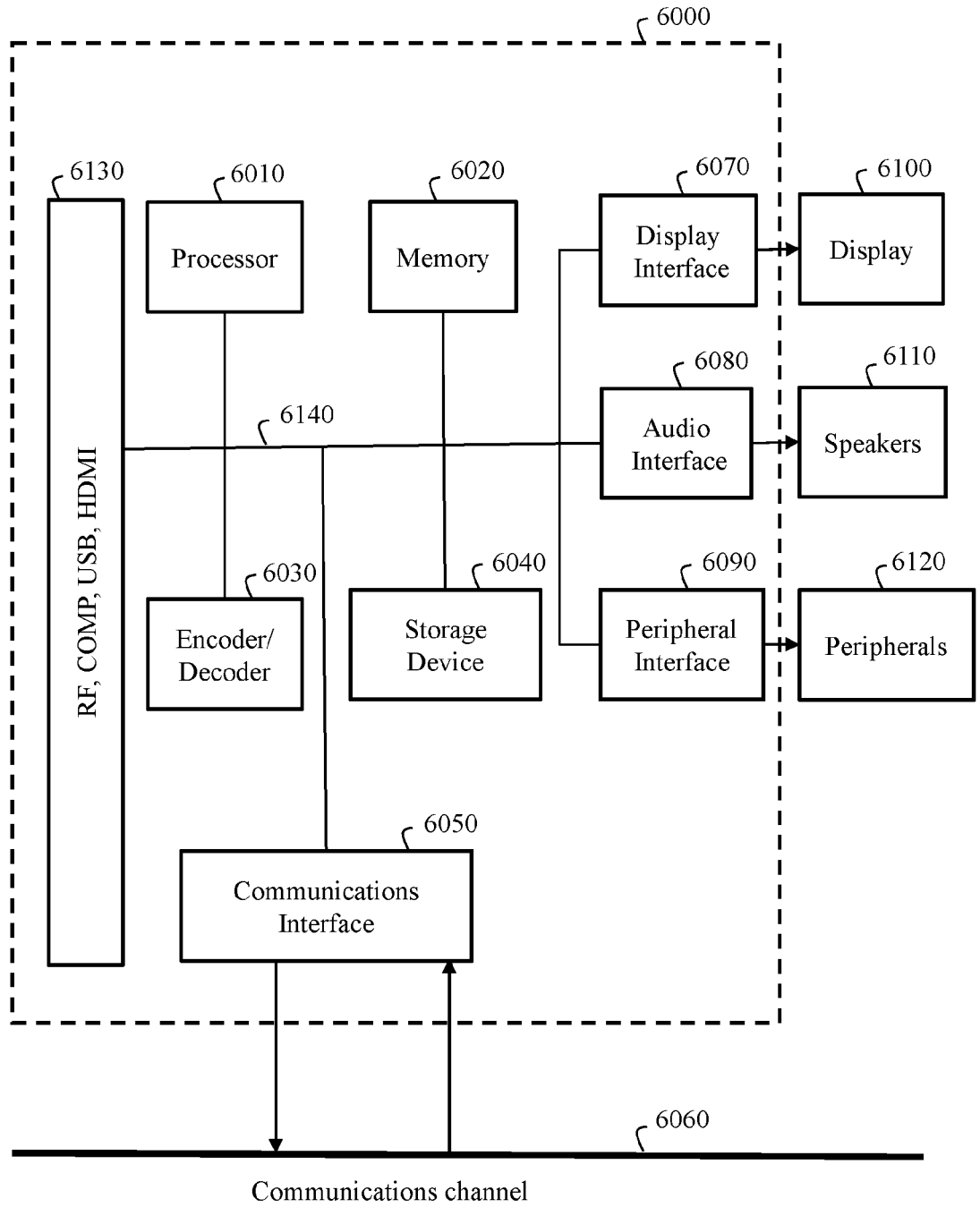
FIG. 6 illustrates a schematic block diagram of an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/attribute videos/images or portions of the encoded/decoded geometry/attribute video/images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable)

medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface 6050 may include, but is not limited to, a transceiver configured to transmit and to receive data over communication channel 6060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

The streamed data may be used as a way for signaling information used by the system 5000. The signaling information may comprise the information INF explained above.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 6000 and the display 6100, speakers 6110, or other peripheral devices 6120 using signaling such as AV.Link (Audio/Video Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 6000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

In V-PCC, the regular geometry patch of 2D samples and the first geometry patches of 2D samples are stored in a geometry image GI, the second geometry patches of 2D samples are stored in the occupancy map OM and the regular, first and second attribute patches of 2D samples are stored in attribute image TI at locations indicated by syntax elements.

Storing together in a same video stream the regular, first and second attribute patches of 2D samples may have the advantage of requiring only one video encoder/decoder for coding/decoding the attribute information of 3D samples.

By design, the regular, first and second geometry/attribute encoding mode respond to different needs. Thus, their attribute format, scanning order, size and shape are different. Therefore, the way to reduce information (or encode/code/compress) may require different methods, especially when it comes to reduce spatial "intra" redundancies. Besides, it may be of interest to code the geometry/attribute of in-between 3D samples (EOM codewords) with lossless video codecs while the geometry/attribute of sparse 3D samples (somehow less representative of the focus of a typical point cloud scene), which are typically encoded by using the first geometry/attribute encoding mode), may be subject to lossy coding or vice versa according to the application.

Consequently, encoding the geometry/attribute of 3D samples requires both these regular, first and second coding modes that require specific (an uncommon) profiled video codecs including processes adapted to each of these two coding modes, and additional signaling for indicating to a decoder which of these coding modes have to be used for decoding the geometry and attribute of 3D samples.

Allowing multiple coding modes for encoding 3D samples of a point cloud frame may thus have impact on the performance (complexity of the encoder/decoder and reduction of the bandwidth).

Generally speaking, at least one of the present embodiment provides a method of encoding attributes of orthogonally projected 3D samples and in-between 3D samples in which an information INF indicates whether at least one first attribute patch of 2D samples obtained by encoding the attribute of said at least one orthogonally projected 3D samples according to a first attribute coding mode, and at least one second attribute patch of 2D samples of an image obtained by encoding the attribute of at least one in-between 3D sample, are stored in separate images.

Separate images may mean images of a same video stream but at different time instants or images of different video streams (that do not belong to a same video stream).

The information INF allows more flexibility in terms of video codec usage and also better compression performance because video codecs may be tuned for encoding attribute of orthogonally 3D samples or in-between 3D samples. Tuning video codec may then take into account particularities of the attribute of these 3D samples and/or meet applications constraints and requirements. For example, first and/or second attribute patches of 2D samples may be discarded according to the applications or decoder/renderer capabilities (e.g. some 3D samples may not be helpful for points cloud rendered on a small display with possibly an associated low-end SoC for decoding).

Moreover, the video streams storing those attributes may be processed in parallel.

Figure 7:
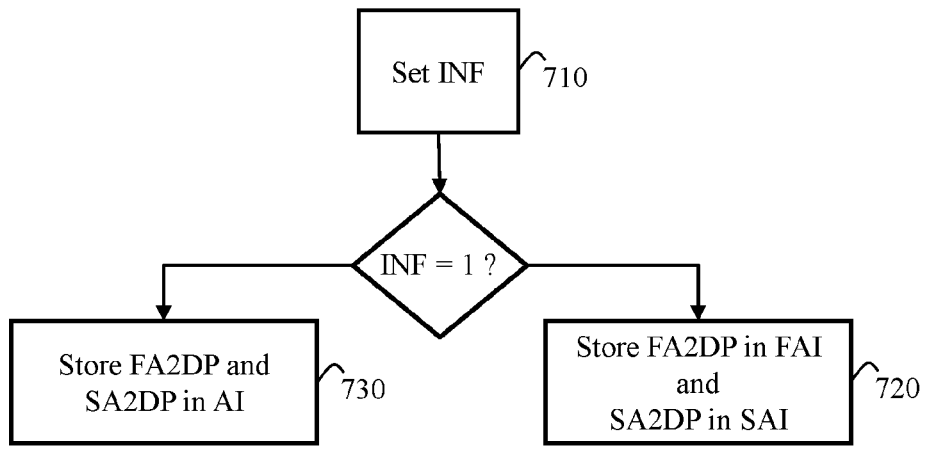
FIGS. 7 and 7a show examples of flowcharts of a method for encoding orthogonally 3D samples of a point cloud frame in accordance with at least one embodiment.

FIG. 7 shows an example of a flowchart of a method for encoding orthogonally 3D samples of a point cloud frame in accordance with at least one embodiment.

In step 710, the information INF may be set to a first particular value (for example 1) to indicate that at least one first attribute patch of 2D samples FA2DP (step 3400) and at least one second attribute patch of 2D samples SA2DP (step 3400) are stored in separate images. The information INF may also be set to a second particular value (for example 0) to indicate that said at least one first attribute patch of 2D samples FA2DP and said at least one second attribute patch of 2D samples SA2DP are stored in a same image.

When the information INF equals said first particular value, then, in step 720, said at least one first attribute patch of 2D samples FA2DP is stored in a first image FAI, and said at least one second attribute patch of 2D samples SA2DP is stored in a second image SAI.

When the information INF equals said second particular value, then, in step 730, said at least one first attribute patch of 2D samples FA2DP and said at least one second attribute patch of 2D samples SA2DP are stored in a same image AI.

Figure 7A:
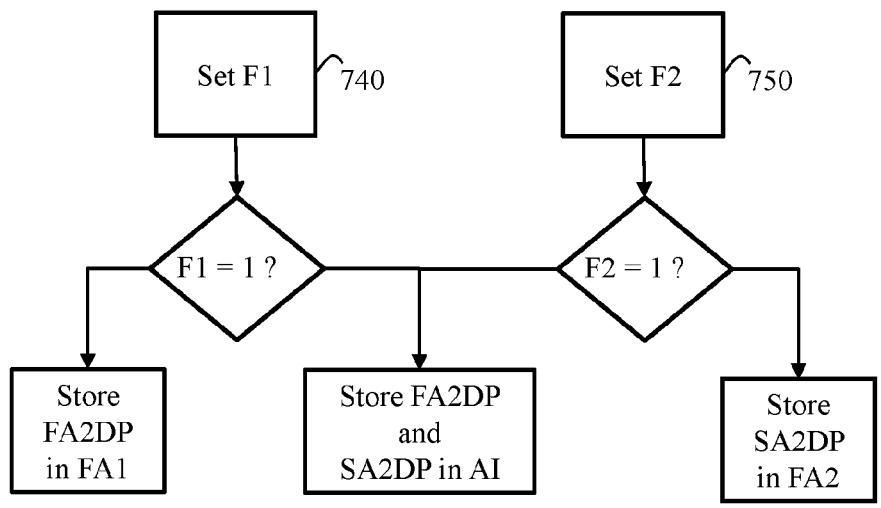

According to an embodiment, illustrates in FIG. 7*a*, the information INF comprises a first binary flag F1 and a second binary flag F2.

In step 740, the first flag F1 may be set to a first particular value (for example 1) to indicate that at least one first attribute patch of 2D samples FA2DP (step 3400) is stored in a first image FA1 and may be set to a second particular value (for example 0) to indicate that at least one first attribute patch of 2D samples FA2DP (step 3400) is stored in an image AI.

In step 750, the second flag F2 may be set to a first particular value (for example 1) to indicate that at least one second attribute patch of 2D samples SA2DP (step 3400) is stored in a second image FA2 and may be set to a second particular value (for example 0) to indicate that at least one second attribute patch of 2D samples FA2DP (step 3400) is stored in the image AI.

When the first flag F1 and the second flag F2 equal to 1, the first and second attribute patch of 2D samples FA2DP and SA2DP are stored in separate images.

When the first flag F1 equals 0 and the second flag F2 equals 1, the first attribute patches of 2D samples FA2DP and the regular attribute 2D patches RA2DP are stored in a same image and the second attribute patch of 2D samples SA2DP are stored in a separate image.

When the first flag F1 equals 1 and the second flag F2 equal to 0, the second attribute patches of 2D samples SA2DP and the regular attribute 2D patches RA2DP are stored in a same image and the first attribute patch of 2D samples FA2DP are stored in a separate image.

When the first flag F1 and the second flag F2 equal to 0, the first and second attribute patch of 2D samples FA2DP and SA2DP are stored in a same image.

According to a variant, the information INF is valid at the group of pictures level, frame/atlas level or patch level.

According to a variant, a syntax element is added in the bitstream to identify a video codec used to compress a video stream carrying the second attribute patch of 2D samples.

This codec may be identified through a component codec mapping SEI message or through means outside the V-PCC specification.

Such syntax element, denoted ai_eom_attribute_codec_id [atlas_id] may be added to an attribute information syntax structure conditionally to a particular value of another syntax element such as the syntax element vpcc_eom_patch_separate_video_present_flag flag of FIG. 8.

FIG. 8 illustrates an example of a syntax element vpcc_eom_patch_separate_video_present_flag embedded the information INF in accordance with at least one embodiment.

The syntax element vpcc_eom_patch_separate_video_present_flag may be coded in a parameter set, such as a Sequence Parameter Set (SPS), Atlas Sequence Parameter Set (ASPS), or Picture Parameter Set (PPS).

Elements of FIG. 8 have the following semantics:
vpcc_eom_patch_separate_video_present_flag[j] equal to 1 to indicate that a second attribute patch of 2D samples with index j may be stored in a separate video stream.
vpcc_eom_patch_separate_video_present_flag[j] equal to 0 indicates that a second attribute patch of 2D samples with index j shall not be stored in a separate video stream.
When vpcc_eom_patch_separate_video_present_flag[j] is not present, it is inferred to be equal to 0.
epdu_patch_in_eom_video_flag[p] specifies whether the attribute data associated with a second attribute patch of 2D samples with index p in a current atlas tile group is encoded in a separate video compared to those of the intra and inter coded patches. If epdu_patch_in_eom_video_flag[p] is equal to 0, the attribute data associated with t a second attribute patch of 2D samples with index j in the current atlas tile group is encoded in the same video as those of the intra and inter coded patches. If epdu_patch_in_eom_video_flag[p] is equal to 1, the attribute data associated with a second attribute patch of 2D samples with index j in the current atlas tile group is encoded in a separate video from those of the intra and inter coded patches. If epdu_patch_in_eom_video_flag[p] is not present, its value shall be inferred to be equal to 0.

In a variant, the syntax element vpcc_eom_patch_separate_video_present_flag[j] may be common to the first and second attribute patches of 2D samples.

Then, when vpcc_separate_video_present_flag[j] equal to 1 indicates that the second attribute patches of 2D samples, the first attribute patch of 2D samples and the first geometry patches of 2D samples for an atlas with index j may be stored in a separate image (separate video stream When vpcc_separate_video_present_flag[j] equal to 0 indicates that the second attribute patches of 2D samples, the first attribute patch of 2D samples and the first geometry patches of 2D samples for an atlas with index j shall not be stored in a separate video stream.

When vpcc_separate_video_present_flag[j] is not present, it is inferred to be equal to 0.

In FIG. 1-8, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder. In various embodiments, such processes also, or alternatively, include processes performed by a decoder of various implementations described in this application, for example.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder. In various embodiments, such processes also, or alternatively, include processes performed by an encoder of various implementations described in this application.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

Various embodiments refer to rate distortion optimization. In particular, during the encoding process, the balance or trade-off between the rate and distortion is usually considered, often given the constraints of computational complexity. The rate distortion optimization may be usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information INF that may be carried by a syntax element vpcc_eom_patch_separate_video_present_flag. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   encoding at least one attribute of first 3D samples of a point cloud, wherein the at least one attribute of said first 3D samples is encoded as at least one first attribute patch of 2D samples; wherein said first 3D samples being 3D samples whose 3D coordinates are encoded as pixel values of a patch of a geometry image,
   encoding at least one attribute of in-between 3D samples, in-between 3D samples being 3D samples of the point cloud located between two orthogonally projected 3D samples of the point cloud along a same projection line, wherein the at least one attribute of in-between 3D samples is encoded as at least one second attribute patch of 2D samples; and
   encoding an information indicating whether said at least one first attribute patch of 2D samples and said at least one second attribute patch of 2D samples are stored in separate images,
   wherein the information comprises
   a first flag that indicates whether said at least one first attribute patch of 2D samples is stored in a first image or if said at least one first attribute patch of 2D samples is stored with an other attribute patch of 2D samples in a second image, and
   a second flag that indicates whether said at least one second attribute patch of 2D samples is stored in a third image or if said at least one second attribute patch of 2D samples is stored with the other attribute patch of 2D samples in said second image.

2. The method of claim 1, further comprising encoding another information indicating how a separate image is compressed.

3. The method of claim 1, wherein
   3D coordinates of said first 3D samples are encoded as pixel values of a patch of a first geometry image,
   3D coordinates of the in-between 3D samples are encoded as coordinates of pixels on a projection plane onto which the in-between 3D samples are projected and codewords encoded in an occupancy image wherein one bit of codewords indicates a location of an in-between 3D sample along the projection line, and
   3D coordinates of said orthogonally projected 3D samples are encoded as coordinates of pixels on the projection plane onto which the orthogonally projected 3D samples are projected and as values of said pixels.

4. A method comprising:
   decoding at least one attribute of first 3D samples of a point cloud, wherein the at least one attribute of said first 3D samples is decoded from at least one first attribute patch of 2D samples, wherein said first 3D samples being 3D samples whose 3D coordinates are decoded as pixel values of a patch of a geometry image;
   decoding at least one attribute of in-between 3D samples, in-between 3D samples being 3D samples of the point cloud located between two orthogonally projected 3D samples of the point cloud along a same projection line, wherein the at least one attribute of in-between 3D samples is decoded as at least one second attribute patch of 2D samples; and decoding an information indicating whether said at least one first attribute patch of 2D samples and said at least one second attribute patch of 2D samples are stored in separate images, wherein the information comprises a first flag that indicates whether said at least one first attribute patch of 2D samples is stored in a first image or if said at least one first attribute patch of 2D samples is stored with an other attribute patch of 2D samples in a second image, and a second flag that indicates whether said at least one second attribute patch of 2D samples is stored in a third image or if said at least one second attribute patch of 2D samples is stored with the other attribute patch of 2D samples in said second image.

5. The method of claim 4, wherein the at least one attribute of said 3D samples, the at least one attribute of in-between 3D samples, and said information are decoded from a video stream being hierarchically structured at a group of pictures level, frame level and patch level, and wherein said information is valid either at the group of pictures level, frame level, atlas level or patch level.

6. The method of claim 4, further comprising decoding another information indicating how a separate image is compressed.

7. The method of claim 4, wherein 3D coordinates of said first 3D samples are encoded as pixel values of a patch of a first geometry image, 3D coordinates of the in-between 3D samples are encoded as coordinates of pixels on a projection plane onto which the in-between 3D samples are projected and codewords encoded in an occupancy image wherein one bit of codewords indicates a location of an in-between 3D sample along the projection line, and 3D coordinates of said orthogonally projected 3D samples are encoded as coordinates of pixels on the projection plane onto which the orthogonally projected 3D samples are projected and as values of said pixels.

8. The method of claim 7, wherein codewords are packed to form at least one second geometry patch of 2D samples is stored in an occupancy map.

9. An apparatus comprising one or more processors configured to:

encode at least one attribute of first 3D samples of a point cloud, wherein the at least one attribute of said first 3D samples is encoded as at least one first attribute patch of 2D samples, wherein said first 3D samples being 3D samples whose 3D coordinates are encoded as pixel values of a patch of a geometry image;

encode at least one attribute of in-between 3D samples, in-between 3D samples being 3D samples of the point cloud located between two orthogonally projected 3D samples of the point cloud along a same projection line, wherein the at least one attribute of in-between 3D samples is encoded as at least one second attribute patch of 2D samples; and encode an information indicating whether said at least one first attribute patch of 2D samples and said at least one second attribute patch of 2D samples are stored in separate images, wherein the information comprises a first flag that indicates whether said at least one first attribute patch of 2D samples is stored in a first image or if said at least one first attribute patch of 2D samples is stored with an other attribute patch of 2D samples in a second image, and a second flag that indicates whether said at least one second attribute patch of 2D samples is stored in a third image or if said at least one second attribute patch of 2D samples is stored with the other attribute patch of 2D samples in said second image.

10. The apparatus of claim 9, wherein the one or more processors are further configured to encode another information indicating how a separate image is compressed.

11. The device of claim 9, wherein 3D coordinates of said first 3D samples are encoded as pixel values of a patch of a first geometry image, 3D coordinates of the in-between 3D samples are encoded as coordinates of pixels on a projection plane onto which the in-between 3D samples are projected and codewords encoded in an occupancy image wherein one bit of codewords indicates a location of an in-between 3D sample along the projection line, and 3D coordinates of said orthogonally projected 3D samples are encoded as coordinates of pixels on the projection plane onto which the orthogonally projected 3D samples are projected and as values of said pixels.

12. The device of claim 11, wherein codewords are packed to form at least one second geometry patch of 2D samples is stored in an occupancy map.

13. An apparatus comprising one or more processors configured to:

decode at least one attribute of first 3D samples, wherein the at least one attribute of said first 3D samples is decoded from at least one first attribute patch of 2D samples, wherein said first 3D samples being 3D samples whose 3D coordinates are decoded as pixel values of a patch of a geometry image;

decode at least one attribute of in-between 3D samples, in-between 3D samples being 3D samples of the point cloud located between two orthogonally projected 3D samples of the point cloud along a same projection line, wherein the at least one attribute of in-between 3D samples is decoded as at least one second attribute patch of 2D samples; and decode an information indicating whether said at least one first attribute patch of 2D samples and said at least one second attribute patch of 2D samples are stored in separate images, wherein the information comprises a first flag that indicates whether said at least one first attribute patch of 2D samples is stored in a first image or if said at least one first attribute patch of 2D samples is stored with an other attribute patch of 2D samples in a second image, and a second flag that indicates whether said at least one second attribute patch of 2D samples is stored in a third image or if said at least one second attribute patch of 2D samples is stored with the other attribute patch of 2D samples in said second image.

14. The apparatus of claim 13, wherein the at least one attribute of said 3D samples, the at least one attribute of in-between 3D samples, and said information are decoded from a video stream being hierarchically structured at a group of pictures level, frame level and patch level, and wherein said information is valid either at the group of pictures level, frame level, atlas level or patch level.

15. The apparatus of claim 13, further configured for decoding another information indicating how a separate image is compressed.

16. The device of claim 13, wherein
3D coordinates of said first 3D samples are encoded as pixel values of a patch of a first geometry image,
3D coordinates of the in-between 3D samples are encoded as coordinates of pixels on a projection plane onto which the in-between 3D samples are projected and codewords encoded in an occupancy image wherein one bit of codewords indicates a location of an in-between 3D sample along the projection line, and
3D coordinates of said orthogonally projected 3D samples are encoded as coordinates of pixels on the projection plane onto which the orthogonally projected 3D samples are projected and as values of said pixels.

17. The device of claim 16, wherein codewords are packed to form at least one second geometry patch of 2D samples is stored in an occupancy map.

18. A non-transitory computer-readable medium comprising coded data representative of a point cloud, the coded data comprising:
at least one video data attribute of first 3D samples of the point cloud, wherein the at least one video data attribute of said first 3D samples is encoded as at least one first attribute patch of 2D samples, wherein said first 3D samples being 3D samples whose 3D coordinates are encoded as pixel values of a patch of a geometry image;
at least one video data attribute of in-between 3D samples, in-between 3D samples being 3D samples of the point cloud located between two orthogonally projected 3D samples of the point cloud along a same projection line, wherein the at least one video data attribute of in-between 3D samples is encoded as at least one second attribute patch of 2D samples; and
an information indicating whether said at least one first attribute patch of 2D samples and said at least one second attribute patch of 2D samples are stored in separate images,
wherein the information comprises
a first flag that indicates whether said at least one first attribute patch of 2D samples is stored in a first image or if said at least one first attribute patch of 2D samples is stored with an other attribute patch of 2D samples in a second image, and
a second flag that indicates whether said at least one second attribute patch of 2D samples is stored in a third image or if said at least one second attribute patch of 2D samples is stored with the other attribute patch of 2D samples in said second image.

19. The non-transitory computer-readable medium of claim 18, wherein
3D coordinates of said first 3D samples are encoded as pixel values of a patch of a first geometry image,
3D coordinates of the in-between 3D samples are encoded as coordinates of pixels on a projection plane onto which the in-between 3D samples are projected and codewords encoded in an occupancy image wherein one bit of codewords indicates a location of an in-between 3D sample along the projection line, and
3D coordinates of said orthogonally projected 3D samples are encoded as coordinates of pixels on the projection plane onto which the orthogonally projected 3D samples are projected and as values of said pixels.

20. A non-transitory computer-readable medium including instructions for causing one or more processors to perform a method, the method comprising:
decoding at least one attribute of first 3D samples of a point cloud, wherein the least one attribute of said first 3D samples is decoded from at least one first attribute patch of 2D samples, wherein said first 3D samples being 3D samples whose 3D coordinates are decoded as pixel values of a patch of a geometry image;
decoding at least one attribute of in-between 3D samples, in-between 3D samples being 3D samples of the point cloud located between two orthogonally projected 3D samples of the point cloud along a same projection line, wherein the at least one attribute of in-between 3D samples is decoded as at least one second attribute patch of 2D samples in an image; and
decoding an information indicating whether said at least one first attribute patch of 2D samples and said at least one second attribute patch of 2D samples are stored in separate images,
wherein the information comprises
a first flag that indicates whether said at least one first attribute patch of 2D samples is stored in a first image or if said at least one first attribute patch of 2D samples is stored with an other attribute patch of 2D samples in a second image, and
a second flag that indicates whether said at least one second attribute patch of 2D samples is stored in a third image or if said at least one second attribute patch of 2D samples is stored with the other attribute patch of 2D samples in said second image.

* * * * *